US008845922B2

(12) United States Patent
Singh et al.

(10) Patent No.: US 8,845,922 B2
(45) Date of Patent: Sep. 30, 2014

(54) COMPOSITIONS AND USE OF VINYLIDENE FLUORIDE AND BLENDS THEREOF

(75) Inventors: Rajiv Ratna Singh, Getzville, NY (US); Ryan Hulse, Getzville, NY (US)

(73) Assignee: Honeywell International Inc., Morristown, NJ (US)

( * ) Notice: Subject to any disclaimer, the term of this patent is extended or adjusted under 35 U.S.C. 154(b) by 324 days.

(21) Appl. No.: 13/331,662

(22) Filed: Dec. 20, 2011

(65) Prior Publication Data

US 2013/0153817 A1 Jun. 20, 2013

(51) Int. Cl.
*C09K 5/04* (2006.01)

(52) U.S. Cl.
USPC .................... 252/67; 62/502; 62/467; 62/498

(58) Field of Classification Search
CPC ........... C09K 5/04; C09K 5/044; C09K 5/045
USPC ............................... 252/67; 62/502, 467, 498
See application file for complete search history.

(56) References Cited

U.S. PATENT DOCUMENTS

| 2,480,560 | A | * | 8/1949 | Downing et al. | ............. 570/149 |
| 6,054,064 | A | | 4/2000 | D'Aubarede et al. | |
| 6,881,354 | B2 | * | 4/2005 | Arman et al. | .................... 252/67 |
| 7,728,978 | B2 | * | 6/2010 | Zhou et al. | .................... 356/437 |
| 2003/0127623 | A1 | | 7/2003 | Maccone et al. | |
| 2011/0252801 | A1 | * | 10/2011 | Minor et al. | .................... 60/645 |
| 2011/0253927 | A1 | * | 10/2011 | Minor et al. | .................... 252/68 |
| 2012/0168672 | A1 | * | 7/2012 | Nappa et al. | .................... 252/67 |

FOREIGN PATENT DOCUMENTS

DE 10 2007 057 262 A1 5/2009

OTHER PUBLICATIONS

R.E. Belke et al., "Poly(vinylidene fluoride)/poly(vinyl acetate) miscible blends: 1. Thermal analysis and spectroscopic (FTi.r.) characterization," Polymer, vol. 29, Oct. 1988, pp. 1831-1842.
M. Paulus-Lanckriet et al., "1,1-Difluoroethylene—a useful fluid for the refrigeration industry revisited," Proceedings—International Congress of Refrigeration, 19th, The Hague, Aug. 20-25, 1995, 4A, pp. 472-480.
Wenfeng Han et al., "Conversion of a CFCs, HFCs and HCFCs waste mixture via reaction with methane," Journal of Hazardous Materials, vol. 184, 2010, pp. 696-703.

* cited by examiner

*Primary Examiner* — Douglas McGinty
(74) *Attorney, Agent, or Firm* — Erika S. Wilson

(57) ABSTRACT

The present technology relates to compositional blends that can be used as refrigerants, and more specifically to blends of vinylidene fluoride and at least one other component for use in very low temperature applications. In at least some examples, the second component can be selected from the group consisting of carbon dioxide and pentafluoroethane. Further, the compositions can be azeotropic or azeotrope-like.

9 Claims, 3 Drawing Sheets

COMPOSITIONS AND USE OF VINYLIDENE FLUORIDE AND BLENDS THEREOF

FIELD OF THE INVENTION

The present technology relates to compositional blends that can be used as refrigerants, and more specifically to blends of vinylidene fluoride ($CH_2=CF_2$) and at least one other component.

DESCRIPTION OF RELATED ART

R508B is a refrigerant that is commonly used in cascade systems and very low temperature applications, such as such as medical freezers and environmental chambers, which tend to operate at temperatures below about −40° C. R508B is an azeotrope-like mixture of 46 wt % trifluoromethane and 54 wt % hexafluoroethane. However, R508B has a high Global Warming Potential (GWP) relative to carbon dioxide ($CO_2$) for an Integration Time Horizon (ITH) of 100 years that is about 13,400. Accordingly, it is desirable to identify low GWP refrigerants that can be used to convert away from the use of R508B.

SUMMARY OF THE INVENTION

The present technology relates to compositions including blends of vinylidene fluoride ($CH_2=CF_2$) and at least one other component, and more specifically to such compositions that can be used as refrigerants in very low temperature applications.

In one aspect, a composition of vinylidene fluoride and a second component is provided. In at least some examples, the second component can be selected from the group consisting of carbon dioxide and pentafluoroethane.

In another aspect, a method of using a composition as a refrigerant is provided that includes: providing a refrigeration system, and adding a composition as a refrigerant to the refrigeration system, the composition comprising vinylidene fluoride and a second component.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
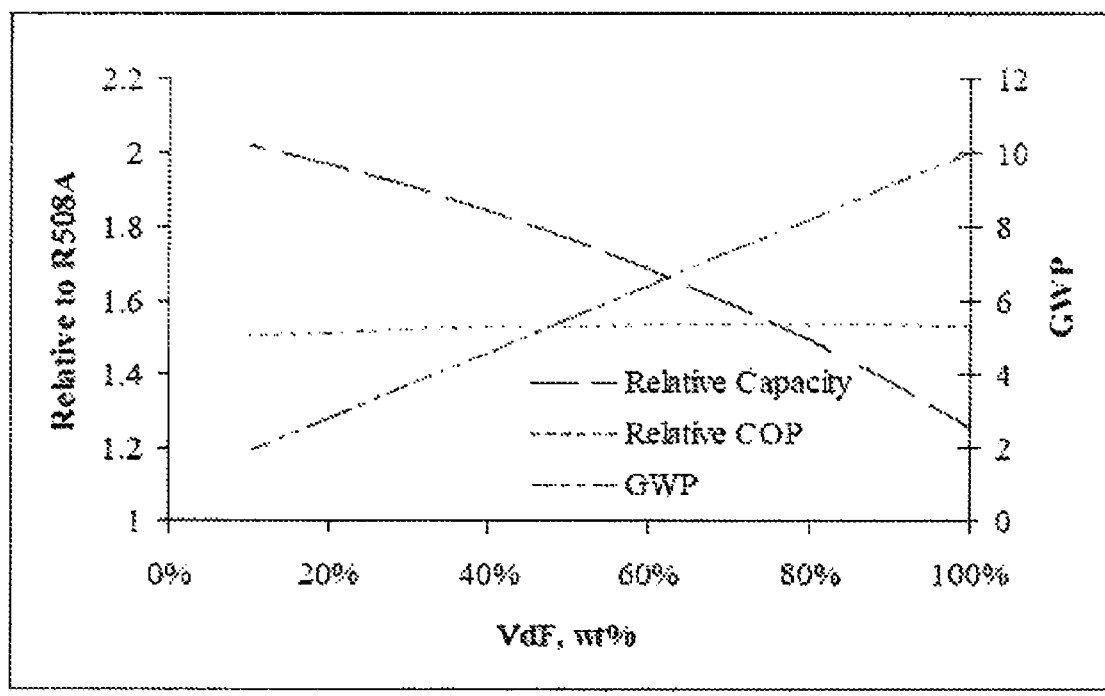
FIG. 1 is a graph illustrating the performance of blends of vinylidene fluoride and carbon dioxide relative to R508B in a low temperature refrigeration system.

The compositions and methods of refrigeration disclosed herein relate to blends that include vinylidene fluoride (CH2=CF2), also known as 1,1 difluoroethylene, VDF and VF2, and at least a second component. More specifically, the refrigerant compositions disclosed herein include, consist essentially of, or consist of, vinylidene fluoride and a second component. The compositions of the present technology are preferably formulated to have an ozone depletion potential (ODP of less than about 0.001, or of about zero. The compositions of the present technology are also preferably formulated to have a Global Warming Potential (GWP) relative to carbon dioxide ($CO_2$) for an Integration Time Horizon (ITH) of 100 years that is less than about 1,000, preferably less than about 500.

In certain examples, the second component can be selected from the group consisting of carbon dioxide ($CO_2$) and pentafluoroethane ($CF_3CHF_2$), also known as HFC-125 or R-125. In at least some examples, the refrigerant compositions include azeotropic or azeotrope-like compositions of vinylidene fluoride and the second component.

Vinylidene fluoride is a refrigerant that has a boiling point of about −85.7° C., and an ozone depletion potential (ODP) of zero. The ozone depletion potential of a chemical compound is the relative amount of degradation to the ozone layer it can cause, with trichlorofluoromethane (R-11 or CFC-11) being defined as having an ozone depletion potential of 1.0. Vinylidene fluoride also has a global warming potential (GWP) relative to $CO_2$ for an Integration Time Horizon (ITH) of 100 years, which is estimated to be from about 2 to about 10. Vinylidene fluoride is also non-toxic.

Carbon dioxide is a refrigerant that has a sublimation point of about −78.5° C., and, by definition, a global warming potential (GWP) relative to $CO_2$ for an Integration Time Horizon (ITH) of 100 years of 1. Carbon dioxide an ozone depletion potential (ODP) of zero, and is non-toxic and non-flammable.

Pentafluoroethane is a refrigerant that has a boiling point of about −48.1° C., and an ozone depletion potential (ODP) of zero. Although pentafluoroethane has zero ozone depletion potential, it does have a global warming potential (GWP) relative to $CO_2$ for an Integration Time Horizon (ITH) of 100 years of about 3450, which is considered to be high. Pentafluoroethane is non-toxic and non-flammable.

It is well-recognized in the art that it is not possible to predict the formation of azeotropes, as indicated, for example, in U.S. Pat. No. 5,648,017 (column 3, lines 64-65) and U.S. Pat. No. 5,182,040 (column 3, lines 62-63), both of which are incorporated herein by reference. Applicants have discovered unexpectedly that vinylidene fluoride forms azeotropic and azeotrope-like compositions with carbon dioxide and with pentafluoroethane.

As used herein, the term "azeotropic or azeotrope-like" is intended in its broad sense to include both compositions that are strictly azeotropic and compositions that behave like azeotropic mixtures. From fundamental principles, the thermodynamic state of a fluid is defined by pressure, temperature, liquid composition, and vapor composition. An azeotropic mixture is a system of two or more components in which the liquid composition and vapor composition are equal at the stated pressure and temperature. In practice, this means that the components of an azeotropic mixture are constant-boiling and cannot be separated during a phase change.

Azeotropic compositions are constant boiling compositions, and azeotrope-like compositions are constant boiling or essentially constant boiling. In other words, for azeotropic and azeotrope-like compositions, the composition of the vapor formed during boiling or evaporation is identical, or substantially identical, to the original liquid composition. Thus, with boiling or evaporation, the liquid composition changes, if at all, only to a minimal or negligible extent. This is to be contrasted with non-azeotrope-like compositions in which, during boiling or evaporation, the liquid composition changes to a substantial degree. All azeotropic or azeotrope-like compositions of the present technology within the indicated ranges, as well as, certain compositions outside these ranges, are azeotrope-like.

The azeotropic or azeotrope-like compositions of the present technology may include additional components that do not form new azeotrope-like systems, or additional components that are not in the first distillation cut. The first distillation cut is the first cut taken after the distillation column displays steady state operation under total reflux conditions. One way to determine whether the addition of a component forms a new azeotrope-like system so as to be outside of this invention is to distill a sample of the composition with the component under conditions that would be expected to separate a non-azeotropic mixture into its separate components. If the mixture containing the additional component is non-azeotrope-like, the additional component will fractionate from the azeotrope-like components. If the mixture is azeotrope-like, some finite amount of a first distillation cut will be obtained that contains all of the mixture components that is constant boiling or behaves as a single substance.

It follows from this that another characteristic of azeotropic or azeotrope-like compositions is that there is a range of compositions containing the same components in varying proportions that are azeotrope-like or constant boiling. All such compositions are intended to be covered by the terms "azeotropic or azeotrope-like" and "constant boiling." As an example, it is well known that at differing pressures, the composition of a given azeotrope will vary at least slightly, as does the boiling point of the composition. Thus, an azeotrope of A and B represents a unique type of relationship, but with a variable composition depending on temperature and/or pressure. It follows that, for azeotrope-like compositions, there is a range of compositions containing the same components in varying proportions that are azeotrope-like. All such compositions are intended to be covered by the term azeotrope-like as used herein.

Accordingly, azeotropic or azeotrope-like compositions of the present technology can comprise, consist essentially of, or consist of, effective amounts of vinylidene fluoride and either carbon dioxide or pentafluoroethane. The term "effective amounts" as used herein refers to the amount of each component which, upon combination with the other component, results in the formation of an azeotropic or azeotrope-like composition.

In some examples, compositions of the present technology comprise, consist essentially of, or consist of vinylidene fluoride and carbon dioxide. The vinylidene fluoride can be present in an amount from about 99 wt % to about 1 wt % based on the total weight of the composition, including but not limited to being present in an amount from about 40 wt % to about 1 wt % based on the total weight of the composition, or from about 20 wt % to about 1 wt % based on the total weight of the composition. The carbon dioxide can be present in an amount from about 1 wt % to about 99 wt % based on the total weight of the composition, including but not limited to from about 60 wt % to about to about 99 wt % based on the total weight of the composition, or from about 80 wt % to about to about 99 wt % based on the total weight of the composition.

In some other examples, compositions of the present technology comprise, consist essentially of, or consist of, vinylidene fluoride and pentafluoroethane. The vinylidene fluoride can be present in an amount from about 99 wt % to about 20 wt % based on the total weight of the composition, including but not limited to being present in an amount from about 90 wt % to about 20 wt % based on the total weight of the composition, or from about 80 wt % to about 20 wt % based on the total weight of the composition. The pentafluoroethane can be present in an amount from about 1 wt % to about 80 wt % based on the total weight of the composition, including but not limited to from about 10 wt % to about to about 80 wt % based on the total weight of the composition, or from about 20 wt % to about to about 80 wt % based on the total weight of the composition.

The compositions of the present technology can be used as refrigerants, and can preferably be used as refrigerants in low temperature refrigeration systems. In at least some examples, the compositions can be used as refrigerants in refrigeration systems used in very low temperature applications, such as such as medical freezers and environmental chambers, which operate at temperatures below about −40° C. Some methods of using compositions of the present technology can include providing a refrigeration system, and adding a composition of the present technology as a refrigerant to the refrigeration system. Preferably, the compositions described herein can be used as drop in replacements for R508B in such refrigeration systems, meaning that the compositions described herein can be used to replace R508B in refrigeration systems that already exist, without the need for substantial modification of the controls or structure of the existing refrigeration system. Accordingly, some methods of using compositions of the present technology can include providing a refrigeration system that includes R508B as a refrigerant, removing R508B from the refrigeration system, and adding a composition of the present technology as a refrigerant to the refrigeration system.

EXAMPLE 1

Vapor Liquid Equilibrium of VDF and $CO_2$

The vapor liquid equilibrium of mixtures of vinylidene fluoride and carbon dioxide were measured using a 40 mL stainless steel cylinder which was connected for a pressure transducer and immersed in a thermostated bath. Initially, the cylinder was initially charged with a degassed sample of vinylidene fluoride. The cylinder was placed in the thermostated bath and allowed to come to equilibrium. After thermal equilibrium had been achieved then the pressure and temperature were recorded. Carbon dioxide was then added incrementally to the cylinder. After each addition thermal equilibrium was achieved, the pressure and temperature were recorded. The procedure was then repeated, with the cylinder being initially charged with carbon dioxide and vinylidene fluoride being incrementally added. Table 1 shows the experimental vinylidene fluoride and carbon dioxide equilibrium data.

TABLE 1

| Temp, ° C. | VDF, wt % | Press, psia |
|---|---|---|
| −78.3 | 31.0 | 25.6 |
| −78.6 | 53.8 | 25.2 |
| −78.8 | 60.9 | 24.3 |
| −78.8 | 71.5 | 23.3 |
| −78.7 | 71.5 | 23.3 |
| −78.9 | 77.1 | 21.9 |
| −78.4 | 84.0 | 22.2 |
| −10.1 | 0.0 | 382.3 |
| −10.1 | 3.3 | 380.9 |
| −10.1 | 11.1 | 377.2 |
| −10.1 | 15.5 | 374.1 |
| −10.1 | 54.7 | 327.7 |
| −10.1 | 61.9 | 316.1 |
| −8.9 | 72.7 | 307.1 |
| −10.1 | 78.2 | 287.6 |
| −10.1 | 85.0 | 274.8 |
| −10.1 | 92.6 | 260.8 |
| −10.1 | 100.0 | 246.0 |

TABLE 1-continued

| Temp, ° C. | VDF, wt % | Press, psia |
|---|---|---|
| 10.0 | 78.7 | 474.4 |
| 10.0 | 85.4 | 454.6 |
| 10.0 | 92.8 | 432.9 |
| 10.0 | 100.0 | 411.1 |

EXAMPLE 2

Vapor Liquid Equilibrium of VDF and HFC-125

The vapor liquid equilibrium of mixtures of vinylidene fluoride and pentafluoroethane were measured using a 40 mL stainless steel cylinder which was connected for a pressure transducer and immersed in a thermostated bath. The cylinder was initially charged with a degassed sample of vinylidene fluoride. The cylinder was placed in the thermostated bath and allowed to come to equilibrium. After thermal equilibrium had been achieved, the pressure and temperature were recorded. Pentafluoroethane was then added incrementally. After each addition of pentafluoroethane, thermal equilibrium was achieved, and the pressure and temperature were recorded. Table 2 shows the experimental vinylidene fluoride and HFC-125 equilibrium data.

TABLE 2

| Temp, ° C. | VDF, wt % | Press, psia |
|---|---|---|
| −10.1 | 100.0 | 246.3 |
| −10.1 | 95.0 | 236.5 |
| −10.1 | 90.4 | 227.5 |
| 10.0 | 100.0 | 411.5 |
| 10.0 | 94.7 | 393.2 |
| 10.0 | 89.9 | 377.6 |

EXAMPLE 3

R508B Replacement Using VDF and $CO_2$

The experimental data in Example 1 was used to evaluate the performance of a blend of vinylidene fluoride and carbon dioxide as a replacement for R508B in one example of a low temperature refrigeration system. In the tested refrigeration system, the evaporator temperature was −50° C., the condenser was −20° C., there was 5° C. of both subcooling and superheat and the isentropic compressor efficiency was 0.7. FIG. 1 shows the performance of the blend of vinylidene fluoride and carbon dioxide relative to R508B. The blend of vinylidene fluoride and carbon dioxide out performed R508B over the entire composition range. The glide of the mixture is never greater than 1.5° C. at any given composition.

EXAMPLE 4

R508B Replacement Using VDF and HFC-125

Figure 2:
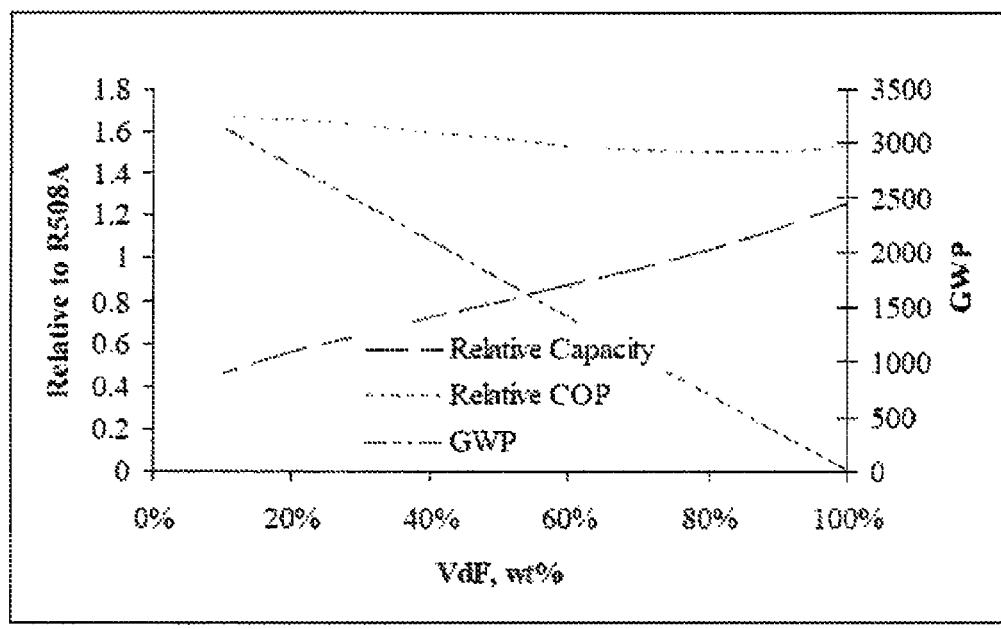
FIG. 2 is a graph illustrating the performance of blends of vinylidene fluoride and pentafluoroethane relative to R508B in a low temperature refrigeration system.

The experimental data in Example 2 was used to evaluate the performance of a blend of vinylidene fluoride and pentafluoroethane as a replacement for R508B in one example of a low temperature refrigeration system. In the tested refrigeration system, the evaporator temperature was −50° C., the condenser was −20° C., there was 5° C. of both subcooling and superheat and the isentropic compressor efficiency was 0.7. FIG. 2 shows the performance of the blend of vinylidene fluoride and pentafluoroethane relative to R508B. In terms of coefficient of performance (COP), the blend of vinylidene fluoride and pentafluoroethane out performs R508B over the entire composition range. The blend of vinylidene fluoride and pentafluoroethane is able to match the capacity to greater than 90% relative the R508B at concentration of greater than 60 wt % vinylidene fluoride. The glide of the mixture is less than about 10° C. at composition of greater then 60 wt % vinylidene fluoride.

EXAMPLE 5

Azeotrope-Like Range of VDF and $CO_2$

Figure 3:
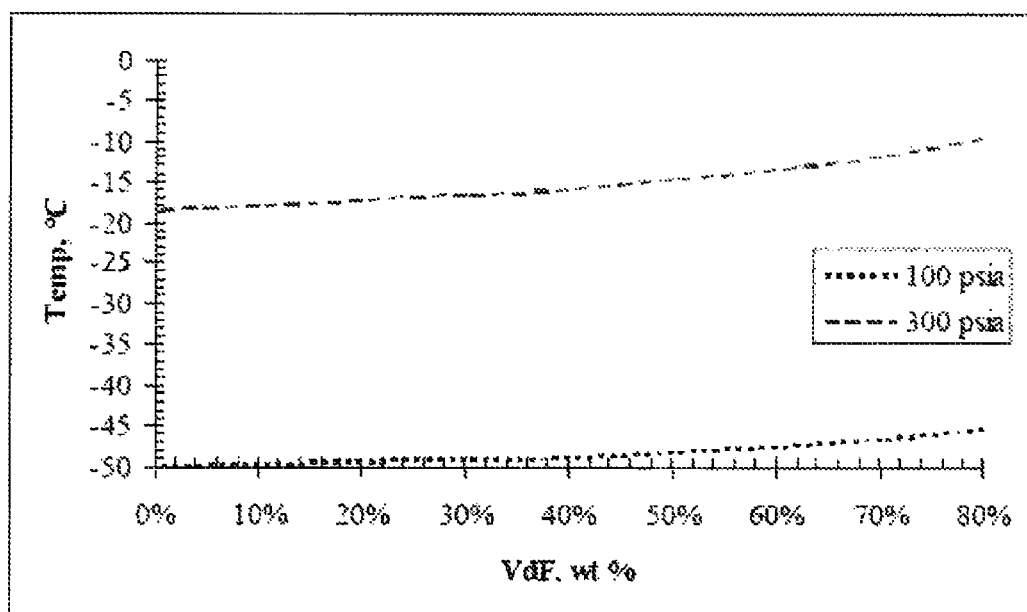
FIG. 3 is a graph illustrating the range in which blends of vilylidene fluoride and carbon dioxide are azeotrope-like at pressures of 100 psi and 300 psi.

The azeotrope-like range of vinylidene fluoride and carbon dioxide is illustrated in FIG. 3. FIG. 3 shows the temperature versus wt % of vinylidene fluoride at 100 psi and 300 psi. The mixture of vinylidene fluoride+carbon dioxide is azeotrope like from about 0 to about 40 wt % vinylidene fluoride at each pressure.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A refrigerant composition consisting essentially of a composition of vinylidene fluoride and a second component, wherein the composition has an ozone depletion potential of less than about 0.001, and a Global Warming Potential relative to carbon dioxide for an Integration Time Horizon of 100 years that is less than about 1,000;
   wherein the second component is carbon dioxide; and
   wherein the composition is an azeotropic or azeotrope-like composition.

2. A refrigerant composition comprising a composition of vinylidene fluoride and a second component, wherein the composition has an ozone depletion potential of less than about 0.001, and a Global Warming Potential relative to carbon dioxide as the second component for an Integration Time Horizon of 100 years that is less than about 1,000, wherein the composition comprises vinylidene fluoride in an amount from about 99 wt % to about 1 wt % based on the total weight of the composition, and carbon dioxide in an amount from about 1 wt % to about 99 wt % based on the total weight of the composition.

3. The refrigerant composition of claim 2, wherein the composition comprises vinylidene fluoride in an amount from about 40 wt % to about 1 wt % based on the total weight of the composition, and carbon dioxide in an amount from about 60 wt % to about 99 wt % based on the total weight of the composition.

4. The refrigerant composition of claim 3, wherein the composition comprises vinylidene fluoride in an amount from about 20 wt % to about 1 wt % based on the total weight of the composition, and carbon dioxide in an amount from about 80 wt % to about 99 wt % based on the total weight of the composition.

5. A method of using a composition as a refrigerant, the method comprising the steps of:
   providing a refrigeration system; and adding a composition as a refrigerant to the refrigeration system, the composition consisting essentially of vinylidene fluoride and a second component;
wherein the second component is carbon dioxide; and
wherein the composition is an azeotropic or azeotrope-like composition.

6. A method of using a composition as a refrigerant, the method comprising the steps of:
providing a refrigeration system; and
adding a composition as a refrigerant to the refrigeration system, the composition comprising vinylidene fluoride and a second component, wherein the composition comprises vinylidene fluoride in an amount from about 99 wt % to about 1 wt % based on the total weight of the composition, and carbon dioxide as the second component in an amount from about 1 wt % to about 99 wt % based on the total weight of the composition.

7. The method of claim 6, wherein the composition comprises vinylidene fluoride in an amount from about 40 wt % to about 1 wt % based on the total weight of the composition, and carbon dioxide in an amount from about 60 wt % to about 99 wt % based on the total weight of the composition.

8. The method of claim 6, wherein the composition comprises vinylidene fluoride in an amount from about 20 wt % to about 1 wt % based on the total weight of the composition, and carbon dioxide in an amount from about 80 wt % to about 99 wt % based on the total weight of the composition.

9. The method of claim 6, wherein the method comprises the steps of:
providing a refrigeration system that includes R508B as a refrigerant;
removing R508B from the refrigeration system; and
adding a composition as a refrigerant to the refrigeration system, the composition comprising vinylidene fluoride and a second component.

\* \* \* \* \*